United States Patent
Strömberg et al.

(10) Patent No.: US 11,403,900 B2
(45) Date of Patent: Aug. 2, 2022

(54) TRANSMITTING SERVICE PROVIDER ACCESS DATA TO A SERVICE PROVIDER SERVER

(71) Applicant: ASSA ABLOY AB, Stockholm (SE)

(72) Inventors: Stefan Strömberg, Stockholm (SE); Sona Singh, Täby (SE)

(73) Assignee: ASSA ABLOY AB, Stockholm (SE)

( * ) Notice: Subject to any disclaimer, the term of this patent is extended or adjusted under 35 U.S.C. 154(b) by 0 days.

(21) Appl. No.: 16/982,904

(22) PCT Filed: Apr. 10, 2019

(86) PCT No.: PCT/EP2019/059032
§ 371 (c)(1),
(2) Date: Sep. 21, 2020

(87) PCT Pub. No.: WO2019/197441
PCT Pub. Date: Oct. 17, 2019

(65) Prior Publication Data
US 2021/0019967 A1    Jan. 21, 2021

(30) Foreign Application Priority Data
Apr. 11, 2018   (EP) .................................... 18166791

(51) Int. Cl.
*H04L 9/08* (2006.01)
*G07C 9/00* (2020.01)
*G07C 9/27* (2020.01)

(52) U.S. Cl.
CPC ..... *G07C 9/00571* (2013.01); *G07C 9/00912* (2013.01); *G07C 9/27* (2020.01); *H04L 9/088* (2013.01); *G07C 2009/0092* (2013.01)

(58) Field of Classification Search
CPC ............. G06F 21/6218; G06F 21/6209; G07C 2009/00412; G07C 9/00571; G07C 9/27;
(Continued)

(56) References Cited

U.S. PATENT DOCUMENTS

| 8,482,378 B2 * | 7/2013 | Sadighi .............. G07C 9/00309 340/5.2 |
| 9,892,584 B1 * | 2/2018 | Saylor ..................... E05B 45/06 |
| 2019/0220818 A1 * | 7/2019 | Kanaoka .......... G06Q 10/08355 |

FOREIGN PATENT DOCUMENTS

| JP | 2019119549 A * | 7/2019 | ........... B60R 25/241 |
| JP | 2019125043 A * | 7/2019 | ........... G06Q 10/083 |

(Continued)

OTHER PUBLICATIONS

Extended Search Report for European Patent Application No. 18166791.6, dated Aug. 6, 2018, 5 pages.

(Continued)

*Primary Examiner* — Dionne Pendleton
(74) *Attorney, Agent, or Firm* — Sheridan Ross P.C.

(57) ABSTRACT

It is provided a method for providing access to a physical space for provision of a service. The method is performed in an access coordinator and comprises the steps of: receiving an approval signal indicating that the service consumer allows a service provider agent of a service provider to open the lock; deriving service provider access data being necessary for the service provider agent to open the lock; transmitting the service provider access data to a service provider server, for storage by the service provider server; deleting the service provider access data from the access coordinator; receiving the service provider access data and a request to assign a service provider agent to open the lock; generating service agent access data; and transmitting the service agent access data to a service provider agent device associated with the service provider agent.

11 Claims, 3 Drawing Sheets

(58) Field of Classification Search
CPC .......... G07C 2009/00825; G07C 2009/00388;
G07C 2009/00769; G07C 2009/00841;
G07C 2009/00865; G07C 2009/0088;
G07C 2209/04; G07C 9/00309; G07C
9/00857; G07C 9/00904; G07C 9/20;
G07C 2209/02; G07C 9/00817; G07C
9/00896; H04L 9/088; H04L 67/306;
H04L 63/0442; H04L 63/08; H04L
63/123; H04L 9/30; B60R 25/02128;
B60R 25/241; E05B 45/06; E05B 49/00;
G08C 17/02; H04W 12/082; H04W 4/02;
H04W 4/80; Y10T 70/625; Y10T 70/70;
Y10T 70/735
See application file for complete search history.

(56) References Cited

FOREIGN PATENT DOCUMENTS

| | | |
|---|---|---|
| WO | WO 03/085533 | 10/2003 |
| WO | WO 2007/126375 | 11/2007 |

OTHER PUBLICATIONS

International Search Report and Written Opinion for International (PCT) Patent Application No. PCT/EP2019/059032, dated Jun. 25, 2019, 12 pages.
International Preliminary Report on Patentability for International (PCT) Patent Application No. PCT/EP2019/059032, dated Mar. 31, 2020, 6 pages.

* cited by examiner

TRANSMITTING SERVICE PROVIDER ACCESS DATA TO A SERVICE PROVIDER SERVER

CROSS REFERENCE TO RELATED APPLICATIONS

This application is a national stage application under 35 U.S.C. 371 and claims the benefit of PCT Application No. PCT/EP2019/059032 having an international filing date of Apr. 10, 2019, which designated the United States, which PCT application claimed the benefit of European Patent Application No. 18166791.6 filed Apr. 11, 2018, the disclosure of each of which are incorporated herein by reference.

TECHNICAL FIELD

The invention relates to a method, an access co-ordinator, a computer program and a computer program product for providing access to a physical space secured by a lock. Specifically, service provider access data is transmitted to a service provider server to allow the service provider access data to be deleted from the access co-ordinator.

BACKGROUND

Locks and keys are evolving from the traditional pure mechanical locks. These days, electronic locks are becoming increasingly common. For electronic locks, no mechanical key profile is needed for authentication of a user. The electronic locks can e.g. be opened using an electronic key stored on a special carrier (fob, card, etc.) or in a smartphone. The electronic key and electronic lock can e.g. communicate over a wireless interface. Such electronic locks provide a number of benefits, including improved flexibility in management of access rights, audit trails, key management, etc.

When an owner or user of such an electronic lock consumes a service, that person is here denoted a service consumer. The service can be any service where the person performing the service needs the electronic lock to be opened. For instance, the service can be a delivery of a product, a cleaning service, a builder/plumber/electrician, etc. To be able to consume the service, the service consumer thus needs to provide access to a service provider using the electronic lock.

When such access is granted by the service consumer, the communication of access rights can be provided using an access coordinator. However, it is of great importance that such access rights are communicated securely in order not to compromise on security.

WO 2007/126375 A1 discloses an access control system and method for operating said system. WO 03/085533 A1 discloses a method and arrangement for controlling access.

SUMMARY

It is an object to provide a way of co-ordinating the communication of access rights where an attack is very unlikely to result in any exposed access rights.

According to a first aspect, it is provided a method for providing access to a physical space, secured by a lock, for provision of a service, the lock being associated with a service consumer. The method is performed in an access coordinator and comprises the steps of: receiving an approval signal from a service consumer device of the service consumer, the approval signal indicating that the service consumer allows a service provider agent of a service provider to open the lock; deriving, from the approval signal, service provider access data being necessary for the service provider agent to open the lock in accordance with the approval signal; transmitting the service provider access data to a service provider server of the service provider, for storage by the service provider server; deleting the service provider access data from the access coordinator; receiving, from the service provider server, the service provider access data and a request to assign a service provider agent to open the lock; generating service agent access data, that is specific for the service provider agent, to allow the service provider agent to open the lock; and transmitting the service agent access data to a service provider agent device associated with the service provider agent.

The step of deleting the service provider access data may comprise ensuring that the service provider access data is stored nowhere in the access coordinator.

The method may further comprise the steps, prior to the step of receiving an approval signal, of: receiving an access request signal from the service provider server; and transmitting a query to the service consumer device asking whether the service provider is to be approved for access to the physical space secured by the lock.

The step of generating service agent access data may comprise electronically signing the service provider access data with a private key of a cryptographic key pair.

The cryptographic key pair may be specific to the service provider. In other words, a cryptographic key pair for one service provider is not used for any other service provider.

According to a second aspect, it is provided an access coordinator for providing access to a physical space, secured by a lock, for provision of a service, the lock being associated with a service consumer. The access coordinator comprises: a processor; and a memory storing instructions that, when executed by the processor, cause the access coordinator to: receive an approval signal from a service consumer device of the service consumer, the approval signal indicating that the service consumer allows a service provider agent of a service provider to open the lock; derive, from the approval signal, service provider access data being necessary for the service provider agent to open the lock in accordance with the approval signal; transmit the service provider access data to a service provider server of the service provider, for storage by the service provider server; delete the service provider access data from the access coordinator; receiving, from the service provider server, the service provider access data and a request to assign a service provider agent to open the lock; generate service agent access data, that is specific for the service provider agent, to allow the service provider agent to open the lock; and transmit the service agent access data to a service provider agent device associated with the service provider agent.

The instructions to delete the service provider access data may comprise instructions that, when executed by the processor, cause the access coordinator to ensure that the service provider access data is stored nowhere in the access coordinator.

The access coordinator may further comprise instructions, executed prior to the instructions to receive an approval signal, that, when executed by the processor, cause the access coordinator to of: receive an access request signal from the service provider server; and transmit a query to the service consumer device asking whether the service provider is to be approved for access to the physical space secured by the lock.

The instructions to generate service agent access data may comprise instructions that, when executed by the processor, cause the access coordinator to electronically sign the service provider access data with a private key of a cryptographic key pair.

The cryptographic key pair may be specific to the service provider.

According to a third aspect, it is provided a computer program for providing access to a physical space, secured by a lock, for provision of a service, the lock being associated with a service consumer. The computer program comprises computer program code which, when run on an access coordinator causes the access coordinator to: receive an approval signal from a service consumer device of the service consumer, the approval signal indicating that the service consumer allows a service provider agent of a service provider to open the lock; derive, from the approval signal, service provider access data being necessary for the service provider agent to open the lock in accordance with the approval signal; transmit the service provider access data to a service provider server of the service provider, for storage by the service provider server; delete the service provider access data from the access coordinator; receiving, from the service provider server, the service provider access data and a request to assign a service provider agent to open the lock; generate service agent access data, that is specific for the service provider agent, to allow the service provider agent to open the lock; and transmit the service agent access data to a service provider agent device associated with the service provider agent.

According to a fourth aspect, it is provided a computer program product comprising a computer program according to the third aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Embodiments presented herein are based on the access co-ordinator decentralising storage of access rights in the time window between when the service consumer approves access and when a service agent is to be allocated access. By not storing the access rights in the access co-ordinator, even if the access co-ordinator were to be attacked and hacked, the attacker would not gain access to all access rights under co-ordination by the access co-ordinator.

Figure 1:
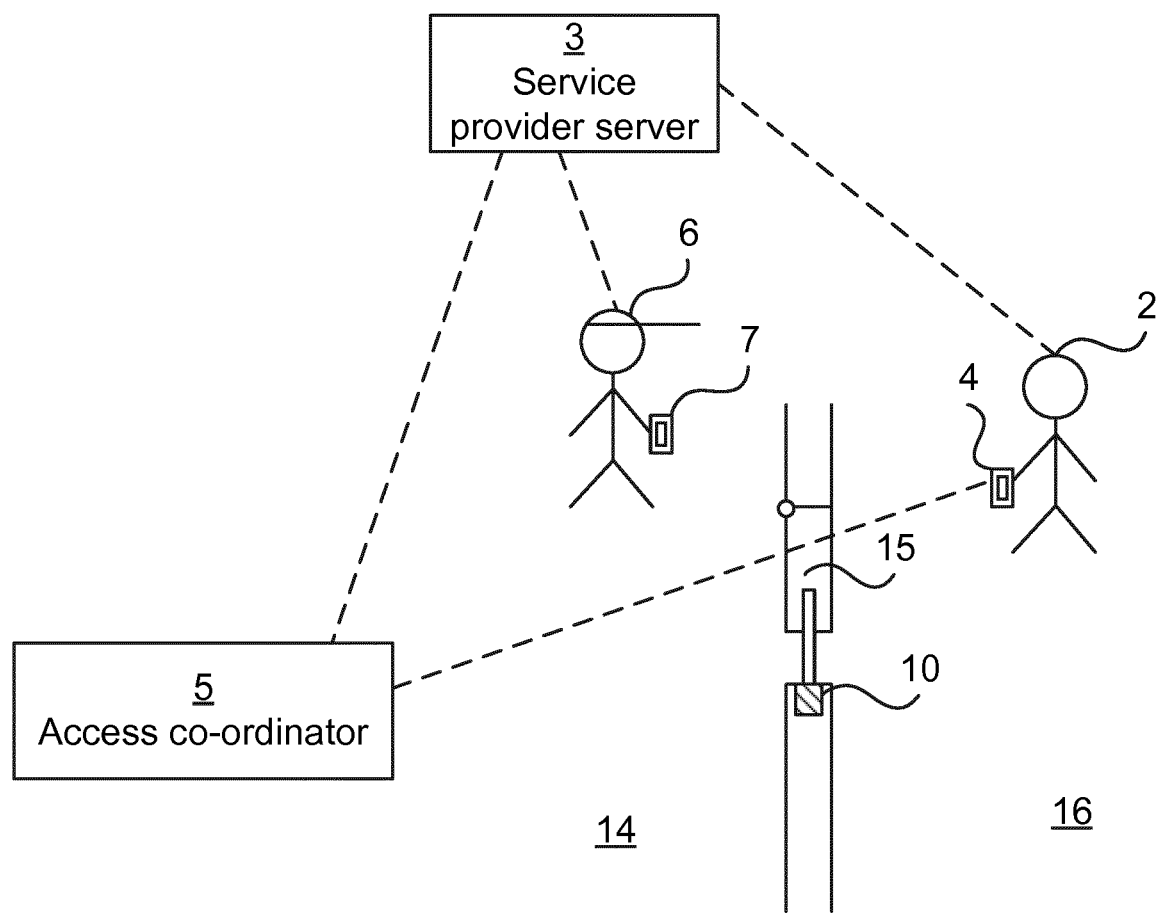
FIG. 1 is a schematic diagram showing an environment in which embodiments presented herein can be applied.

FIG. 1 is a schematic diagram showing an environment in which embodiments presented herein can be applied. Access to a physical space 16 is restricted by a physical barrier 15 which is selectively unlockable. The barrier 15 can be a door, gate, hatch, cabinet door, drawer, window, etc. The physical barrier 15 is provided in a surrounding physical structure (being a wall, fence, ceiling, floor, etc.) and stands between the restricted physical space 16 and an accessible physical space 14. Note that the accessible physical space 14 can be a restricted physical space in itself, but in relation to this physical barrier 15, the accessible physical space 14 is accessible. In order to control the locked or unlocked state of the barrier 15, a lock 10 is provided.

The owner or user of the lock 10 is here denoted a service consumer 2. The service consumer 2 carries a service consumer device 4, which is a portable electronic device, e.g. a smartphone, mobile phone, tablet computer, laptop computer, etc.

The lock 10 is an electronic lock which is capable of communication with the service consumer device 4. The service consumer device 4 can in turn, but does not need to, be connected or connectable to a plurality of similar locks. The service consumer device 4 can configure the lock 10, e.g. by adding and/or removing credentials which should be allowed to have access. This can be configured directly in the lock 10, or by delegating a right to access the lock from a credential in the service consumer device.

The lock 10 is an electronic lock and can be opened using a credential which is not mechanical. For instance, the credential can be an electronic key, and may be implemented as part of a mobile phone, a smartphone, a key fob, wearable device, smart phone case, access card, electronic physical key, etc. The electronic key can communicate with the lock 10 over a wired or wireless interface, e.g. using Bluetooth, Bluetooth Low Energy (BLE), any of the IEEE 802.15 standards, Radio Frequency Identification (RFID), Near Field Communication (NFC).

There is also a service provider server 3, controlled by a service provider. The service provider can e.g. be a delivery company, a cleaning company, a home care company, a building company, a plumber, an electrician, etc. The service provider server 3 can also be provided by a third party, on behalf of the service provider. This is particularly useful for small businesses who may not want to set up their own service provider server.

As explained in more detail below, the service consumer 2 orders a service from the service provider controlling the service provider server 3.

The service provider uses a service provider agent 6 to conduct the service. The service provider agent 6 is a physical person and can be an employee or a sub-contractor of the service provider. The service provider agent 6 carries a service provider agent device 7, which is a portable electronic device, e.g. a smartphone, mobile phone tablet computer, laptop computer, etc. The functions described herein as being performed by the service provider agent device 7, can e.g. be performed in a software application (also known as app) executing on the service provider agent device 7. The service provider agent device 7, as explained in more detail below, receives service agent access data. The service agent access data is provided to the lock 10 to open the lock.

An access co-ordinator 5 is a server which co-ordinates communication between the different parties involved in this scenario of providing a service which needs access to the restricted physical space 16. The access co-ordinator 5 can be implemented as a server capable of performing the functions described herein.

Communication between the different nodes in FIG. 1 can occur using local communication, e.g. using Bluetooth, Bluetooth Low Energy (BLE), any of the IEEE 802.15 standards, any of the IEEE 802.11 standards, wireless USB (Universal Serial Bus), USB, Ethernet, serial connection (e.g. RS-485), etc. and/or over wide area communication such as cellular networks and the Internet. On a higher layer, Internet Protocol (IP) could be used for the communication.

Figure 2:
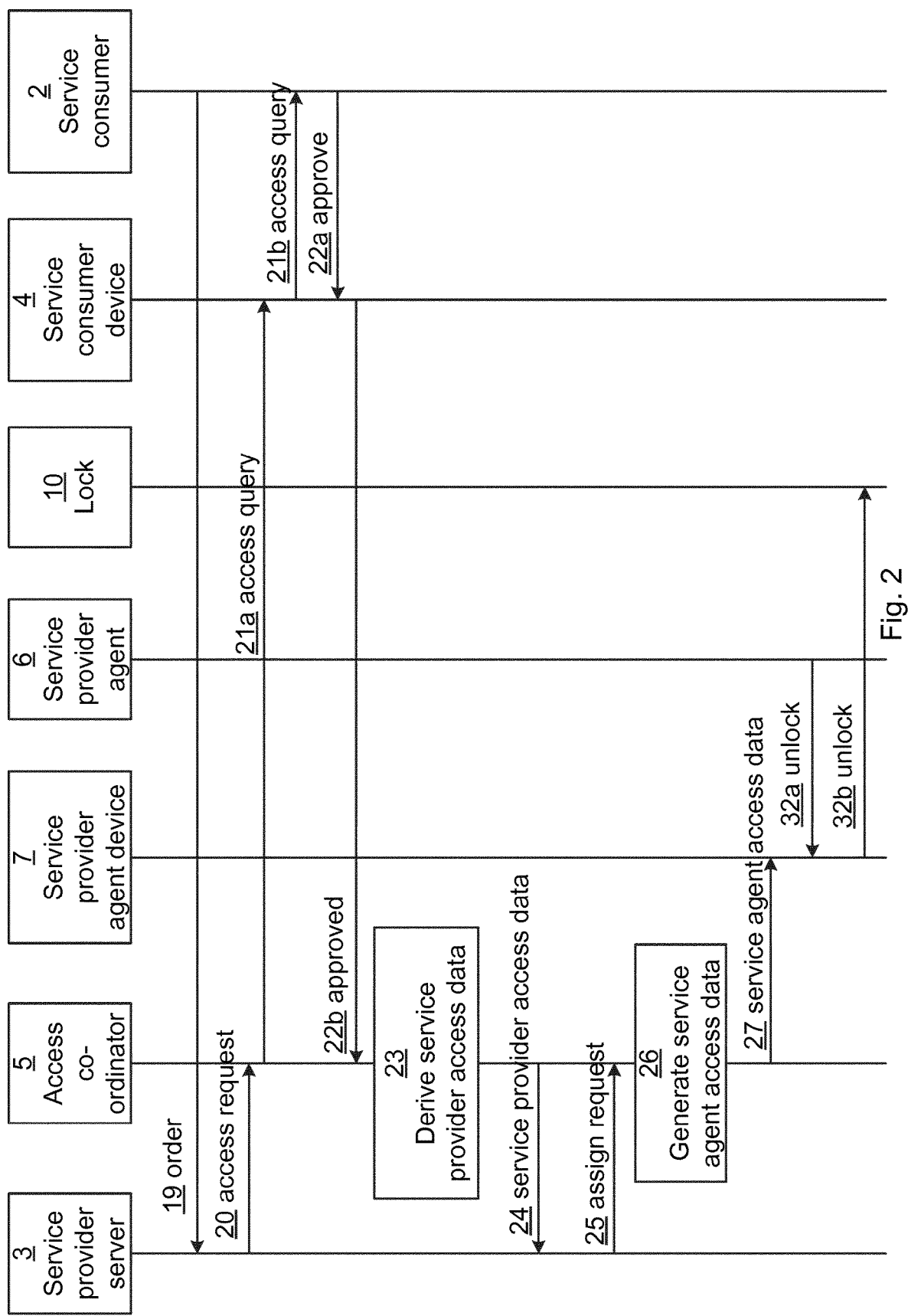
FIG. 2 is a sequence diagram illustrating communication in an example for providing access for a service delivery in the environment of FIG. 1.

FIG. 2 is a sequence diagram illustrating communication in an example for providing a service in the environment of FIG. 1.

First, the service consumer 2 sends an order 19 for a service to a service provider server 3. The order 19 can be an order over an electronic service, such as the Internet, over telephone, in person, etc. When the order 19 is not electronic, a person of the service provider enters data of the order into the service provider server 3. It is to be noted that the order 19 can be an indirect order from the service consumer 2 via a third party and does not need to be directly from the service consumer 2 to the service provider server 3. For instance, in an e-commerce example, the service consumer 2 orders a physical product to be delivered from a vendor (being a third party not shown in FIG. 2). The vendor, in turn, makes use of a delivery company for delivery of the physical product to the service consumer 2. The selection of delivery company can be performed by the service consumer or the vendor. In this case, the service consumer 2 indirectly orders a delivery service from the delivery company, in which case the delivery company is the service provider.

The service provider server 3 sends an access request 20 to the access co-ordinator 5. The access request 20 indicates that the service provider requests access for one of its agents (unspecified at this stage) to open the lock 10 of the service consumer 2. The access request 20 comprises an identifier (e.g. e-mail address or phone number) of the service consumer 2 (or his/her lock 10) and optionally a proposed time or schedule for providing the service of the order 19. The access co-ordinator 5 sends an access query 21a to the service consumer device 4, querying whether the service provider is approved access to the lock, optionally at a specified time. This access query 21a can comprise a public key associated with the service provider. It is to be noted that the key pair containing the public key associated with the service provider can be stored and controlled by the access co-ordinator. However, there is a separate key pair for each service provider.

The service consumer device 4 then asks the service consumer 2, in a corresponding access query 21b, whether the service provider should be approved access using the lock 10, optionally also including a suggested time or time window. This can e.g. be provided as a query in a software application (also known as app) of the service consumer device 4.

The service consumer 2 approves the request (otherwise the sequence ends) in an approval 22a. The service consumer device 4 can at this stage generate an electronic delegation of access right for the lock 10 for the service provider. The service consumer device 4 sends an approval 22b to the access co-ordinator 5, wherein the approval 22b comprises the electronic delegation from the service consumer to the service provider.

The delegation can be based on the public key associated with the service provider server received in the access query 21a. Alternatively, a public key associated with the service provider is retrieved from a key server. The key server is a central database used to keep track of public keys. The central database keeps track of owners of access objects. Moreover, the central database keeps track of service providers and their public keys. This allows the access object owner to find the public key of service providers to thereby connect.

By using the public key of the service provider server, the service consumer device ensures that only the private key of a key pair for the service provider can further delegate the access right (to a service provider agent device) at a later stage. Since there is a separate key pair for each service provider, the service consumer can trust that only agents of the service provider are given access.

The delegation is later verified at the lock by ensuring there is a valid sequence of delegations from the service consumer to the service provider agent device. Each delegation is a delegation of access from a delegator to a delegatee and is provided electronically in a signal to the delegatee. Each delegation also includes any preceding delegations of the sequence. The delegation is signed using an electronic signature by the delegator.

In the example here, the sequence of delegations comprises a delegation from the service consumer to a service provider (wherein the key pair is hosted by the access co-ordinator), and a delegation from the service provider to the service provider agent device. In this way, when the service provider agent device provides both delegations to the lock, the lock can verify that there is a valid sequence of delegations from the service consumer to the service provider agent device, by ensuring that the sequence is valid, that the delegator of the first delegation is the service consumer and that the delegatee of the last delegation is the service provider agent device. The lock also verifies that the first delegation is electronically signed by the service consumer device and that the second delegation is electronically signed by the delegatee of the first delegation, i.e. by the service provider device (as hosted by the access co-ordinator).

Once the access co-ordinator 5 has received the approval signal 22b, the access co-ordinator 5 derives 23, from the approval signal 22b, service provider access data. The service provider access data is necessary for the service provider agent to (at a later stage) open the lock in accordance with the approval signal. Specifically, the service agent access data, used by the service provider agent, will later be generated based on the service provider access data. The service provider access data can contain or be an access delegation, e.g. from the service consumer to the service provider (hosted by the access co-ordinator).

The access co-ordinator 5 transmits the service provider access data 24 to a service provider server of the service provider, for storage by the service provider server. The access co-ordinator 5 can then delete the service provider access data.

At a later stage, which can be a significant amount of time later, when the service provider has allocated an agent (i.e. physical person) to deliver the service to the service consumer, the service provider server 3 transmits an assign request 25 (to assign a service provider agent 6 to open the lock 10) to the access co-ordinator 5. In conjunction with the assign request 25, the service provider server 3 also provides the service provider access data to the access co-ordinator. Optionally, the assign request 25 comprises the service provider access data.

The access co-ordinator generates 26 service agent access data based on the service provider access data. The service agent access data is specific for the particular service provider agent. The service agent access data can be a delegation of the access right from the service provider to the service provider agent, electronically signed by the private key of the key pair for the service provider (hosted by the access co-ordinator).

Once generated, the access co-ordinator 5 transmits the service agent access data 27 to the service provider agent device.

When the service provider agent 6 arrives at the site of the lock 10, the service provider agent 6 provides unlock input 32*a* to the service provider agent device 7 (e.g. using the user interface). The service provider agent device 7 then unlocks 32*b* the lock 10 using the service provider access data received from the access co-ordinator. Optionally, the service provider agent device 7 only allows the unlocking if the validity time of the service provider access data encompasses the current time.

Figure 3:
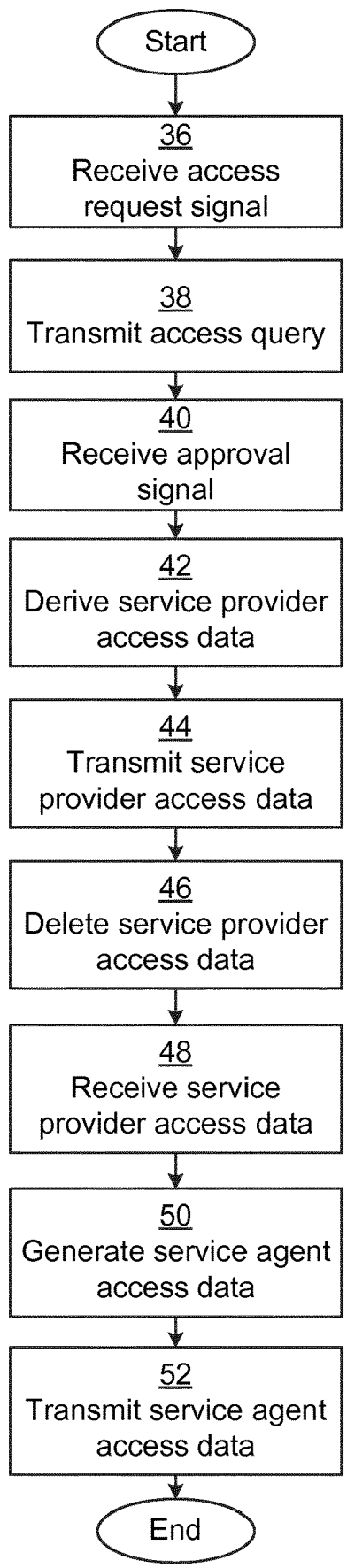
FIG. 3 is a flow chart illustrating embodiments of method for providing access to a physical space for provision of a service.

FIG. 3 is a flow chart illustrating embodiments of method for providing access to physical space secured by a lock for provision of a service. As explained above, the lock is associated with a service consumer. The method is performed in the access co-ordinator and corresponds to the actions of the access coordinator 5 illustrated in FIG. 2 and described above.

In an optional receive access request signal step 36, the access co-ordinator receives an access request signal from the service provider server. The access request signal indicates that the service provider would like access to physical space of the service consumer. The access request signal can contain an identifier of the service consumer and/or service consumer device.

In an optional transmit access query step 38, the access co-ordinator transmits a query to the service consumer device asking whether the service provider is to be approved for access to the physical space secured by the lock. Optionally, the access query contains a public key of a key pair for the service provider. It is to be noted that the key pair can be stored and maintained by the access co-ordinator, as long as the key pair is specific for the service provider.

In a receive approval signal step 40, the access co-ordinator receives an approval signal from a service consumer device of the service consumer, the approval signal indicating that the service consumer allows a service provider agent of a service provider to open the lock. The approval signal can contain a delegation of access rights from the service consumer to the service provider, hereinafter denoted a first delegation.

In a derive service provider access data step 42, the access co-ordinator derives, from the approval signal, service provider access data being necessary for the service provider agent to open the lock in accordance with the approval signal. This step can comprise simply extracting the first delegation from the approval signal, whereby the service provide access data is (or contains) the first delegation.

In a transmit service provider access data step 44, the access co-ordinator transmits the service provider access data to a service provider server of the service provider, for storage by the service provider server.

In a delete service provider access data step 46, the access co-ordinator deletes the service provider access data from the access coordinator. This deletion can comprise ensuring that the service provider access data is stored nowhere in the access coordinator. In this way, if an attacker were to gain access to the access co-ordinator, the attacker is unable to find access data such as the service provider access data, which might be used in order to gain access to the physical space of the service consumer. Still, the service provider does not need to know explicitly what the service provider access data is, as long as the service provider server provides this data when the service provider agent is allocated.

In a receive service provider access data step 48, the access co-ordinator receives, from the service provider server, the service provider access data and a request to assign a service provider agent to open the lock. The request to assign a service provider agent comprises an identifier (e.g. e-mail address or phone number) of the service provider agent.

In a generate service agent access data step 50, the access co-ordinator generates service agent access data, that is specific for the service provider agent, to allow the service provider agent to open the lock. This can comprise electronically signing the service provider access data with a private key of a cryptographic key pair. The cryptographic key pair can be specific to the service provider. The service agent access data can thus be a further delegation of the first delegation, i.e. a second delegation, of access to the lock of the service consumer.

In a transmit service agent access data step 52, the access co-ordinator transmits the service agent access data to a service provider agent device associated with the service provider agent.

Using this method, no critical access data is stored in the access co-ordinator, whereby the access co-ordinator is much less vulnerable to attacks. Furthermore, since the key pair for the service provider is hosted by the access co-ordinator (where each service provider has a separate key pair), the service provider server does not need to perform any cryptographic signing or even storing of the key pair. Furthermore, risk for the service provider is reduced, since the access data it stores cannot be used without the key pair hosted by the co-ordinator.

Figure 4:
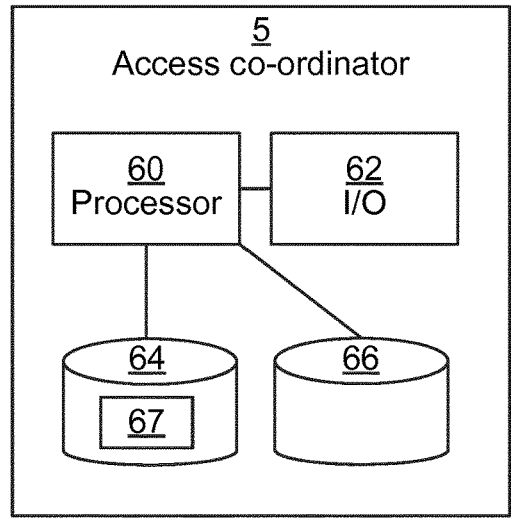
FIG. 4 is a schematic diagram illustrating components of the access coordinator of FIG. 1.

FIG. 4 is a schematic diagram illustrating components of the access co-ordinator 5 of FIG. 1. A processor 60 is provided using any combination of one or more of a suitable central processing unit (CPU), multiprocessor, microcontroller, digital signal processor (DSP), application specific integrated circuit etc., capable of executing software instructions 67 stored in a memory 64, which can thus be a computer program product. The processor 60 can be configured to execute the method described with reference to FIG. 3 above.

The memory 64 can be any combination of random-access memory (RAM) and read-only memory (ROM). The memory 64 also comprises persistent storage, which, for example, can be any single one or combination of magnetic memory, optical memory, solid state memory or even remotely mounted memory.

A data memory 66 is also provided for reading and/or storing data during execution of software instructions in the processor 60. The data memory 66 can be any combination of read and write memory (RAM) and read only memory (ROM).

The access co-ordinator 5 further comprises an I/O interface 62 for communicating with external entities. The I/O interface 62 can comprise components for communication over any suitable communication standard, e.g. Ethernet or gigabit Ethernet.

Other components of the access co-ordinator 5 are omitted in order not to obscure the concepts presented herein.

Figure 5:
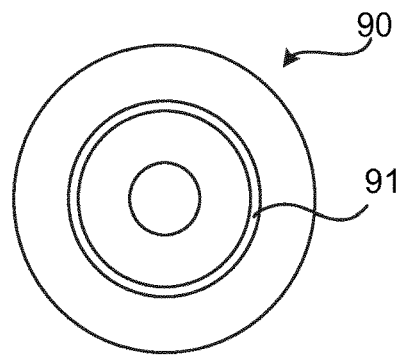
FIG. 5 shows one example of a computer program product comprising computer readable means.

FIG. 5 shows one example of a computer program product comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 4. While the computer program 91 is here schematically shown as a track on the depicted optical disk, the computer program can be stored in any way which is suitable for the computer program product, such as a removable solid-state memory, e.g. a Universal Serial Bus (USB) drive.

The invention has mainly been described above with reference to a few embodiments. However, as is readily appreciated by a person skilled in the art, other embodiments than the ones disclosed above are equally possible within the scope of the invention, as defined by the appended patent claims.

What is claimed is:

1. An access coordinator for providing access to a physical space, secured by a lock, for provision of a service, the lock being associated with a service consumer, the access coordinator comprising:
   a processor; and
   a memory storing instructions that, when executed by the processor, cause the access coordinator to:
   receive an approval signal from a service consumer device of the service consumer, the approval signal indicating that the service consumer allows a service provider agent of a service provider to open the lock;
   derive, from the approval signal, service provider access data being necessary for the service provider agent to open the lock in accordance with the approval signal;
   transmit the service provider access data to a service provider server of the service provider, for storage by the service provider server;
   delete the service provider access data from the access coordinator, wherein the service provider access data is deleted from the access coordinator after the service provider access data is transmitted to the service provider server;
   receiving, from the service provider server and after the service provider access data is deleted from the access coordinator, the service provider access data and a request to assign a service provider agent to open the lock;
   generate service agent access data, that is specific for the service provider agent, to allow the service provider agent to open the lock; and
   transmit the service agent access data to a service provider agent device associated with the service provider agent.

2. The access coordinator according to claim 1, wherein the instructions to delete the service provider access data comprise instructions that, when executed by the processor, cause the access coordinator to ensure that the service provider access data is stored nowhere in the access coordinator.

3. The access coordinator according to claim 1, further comprising instructions, executed prior to the instructions to receive an approval signal, that, when executed by the processor, cause the access coordinator to:
   receive an access request signal from the service provider server; and
   transmit a query to the service consumer device asking whether the service provider is to be approved for access to the physical space secured by the lock.

4. The access coordinator according to claim 1, wherein the instructions to generate service agent access data comprise instructions that, when executed by the processor, cause the access coordinator to electronically sign the service provider access data with a private key of a cryptographic key pair.

5. The access coordinator according to claim 4, wherein the cryptographic key pair is specific to the service provider.

6. A method for providing access to a physical space, secured by a lock, for provision of a service, the lock being associated with a service consumer, the method being performed in an access coordinator and comprising:
   receiving an approval signal from a service consumer device of the service consumer, the approval signal indicating that the service consumer allows a service provider agent of a service provider to open the lock;
   deriving, from the approval signal, service provider access data being necessary for the service provider agent to open the lock in accordance with the approval signal;
   transmitting the service provider access data to a service provider server of the service provider, for storage by the service provider server;
   deleting, after the transmitting, the service provider access data from the access coordinator;
   receiving, from the service provider server and after the deleting, the service provider access data and a request to assign a service provider agent to open the lock;
   generating service agent access data, that is specific for the service provider agent, to allow the service provider agent to open the lock; and
   transmitting the service agent access data to a service provider agent device associated with the service provider agent.

7. The method according to claim 6, wherein deleting the service provider access data comprises ensuring that the service provider access data is stored nowhere in the access coordinator.

8. The method according to claim 6, further comprising:
   receiving an access request signal from the service provider server; and
   transmitting a query to the service consumer device asking whether the service provider is to be approved for access to the physical space secured by the lock.

9. The method according to claim 6, wherein generating service agent access data comprises electronically signing the service provider access data with a private key of a cryptographic key pair.

10. The method according to claim 9, wherein the cryptographic key pair is specific to the service provider.

11. A non-transitory computer-readable medium comprising a computer program for providing access to a physical space, secured by a lock, for provision of a service, the lock being associated with a service consumer, the computer program comprising computer program code which, when run on an access coordinator, causes the access coordinator to:
    receive an approval signal from a service consumer device of the service consumer, the approval signal indicating that the service consumer allows a service provider agent of a service provider to open the lock;
    derive, from the approval signal, service provider access data being necessary for the service provider agent to open the lock in accordance with the approval signal;
    transmit the service provider access data to a service provider server of the service provider, for storage by the service provider server;
    delete the service provider access data from the access coordinator, wherein the service provider access data is deleted from the access coordinator after the service provider access data is transmitted to the service provider server;
    receiving, from the service provider server and after the service provider access data is deleted from the access coordinator, the service provider access data and a request to assign a service provider agent to open the lock;
    generate service agent access data, that is specific for the service provider agent, to allow the service provider agent to open the lock; and
    transmit the service agent access data to a service provider agent device associated with the service provider agent.

\* \* \* \* \*